United States Patent [19]

Laub, III

[11] 4,343,390
[45] Aug. 10, 1982

[54] CASER UNIT FOR CONTAINERS

[76] Inventor: Herman Laub, III, 244 N. San Marino, San Gabriel, Calif. 91775

[21] Appl. No.: 168,305

[22] Filed: Jul. 10, 1980

[51] Int. Cl.³ .............................................. B65G 25/08
[52] U.S. Cl. ..................................... 198/429; 198/747; 53/496; 53/543
[58] Field of Search ..................... 53/496, 497, 543; 198/425, 429, 460, 747

[56] References Cited

U.S. PATENT DOCUMENTS

| | | | |
|---|---|---|---|
| 2,613,021 | 10/1952 | Bones | 53/496 |
| 2,679,963 | 6/1953 | Neal | 198/429 X |
| 2,734,323 | 2/1956 | Laub | 53/467 |
| 3,051,292 | 8/1962 | Sundquist | 198/429 |
| 3,160,259 | 12/1964 | Dalton | 53/497 |
| 3,224,549 | 12/1965 | Cella | 53/497 X |
| 3,434,584 | 3/1969 | Lee | 198/482 X |
| 3,485,339 | 12/1969 | Miller | 198/460 |
| 3,499,555 | 3/1970 | Wahle | 198/429 |
| 3,547,248 | 3/1971 | Mencacci | 198/482 X |
| 3,622,023 | 11/1971 | Keck | 198/425 |
| 3,897,673 | 8/1975 | Kee | 53/496 |
| 3,954,165 | 5/1976 | Snyder | 53/496 X |

Primary Examiner—John Sipos
Attorney, Agent, or Firm—Fred N. Schwend

[57] ABSTRACT

A load of filled containers to be cased is assembled into a caseload by moving the containers in a column to a loading station at one end of a normally stationary conveyor. A control device determines when a complete caseload row is accumulated at the loading station and causes a platen to sweep such row laterally onto the conveyor and to thereafter permit a second row to accumulate at such loading station. A second control device determines when an appropriate number of rows of containers have accumulated on the conveyor to form a caseload and then causes the conveyor to be driven to carry the completed caseload away from the loading station and in spaced-apart relation to other caseloads so that the operator may easily and quickly fit an open case over the caseload.

6 Claims, 3 Drawing Figures

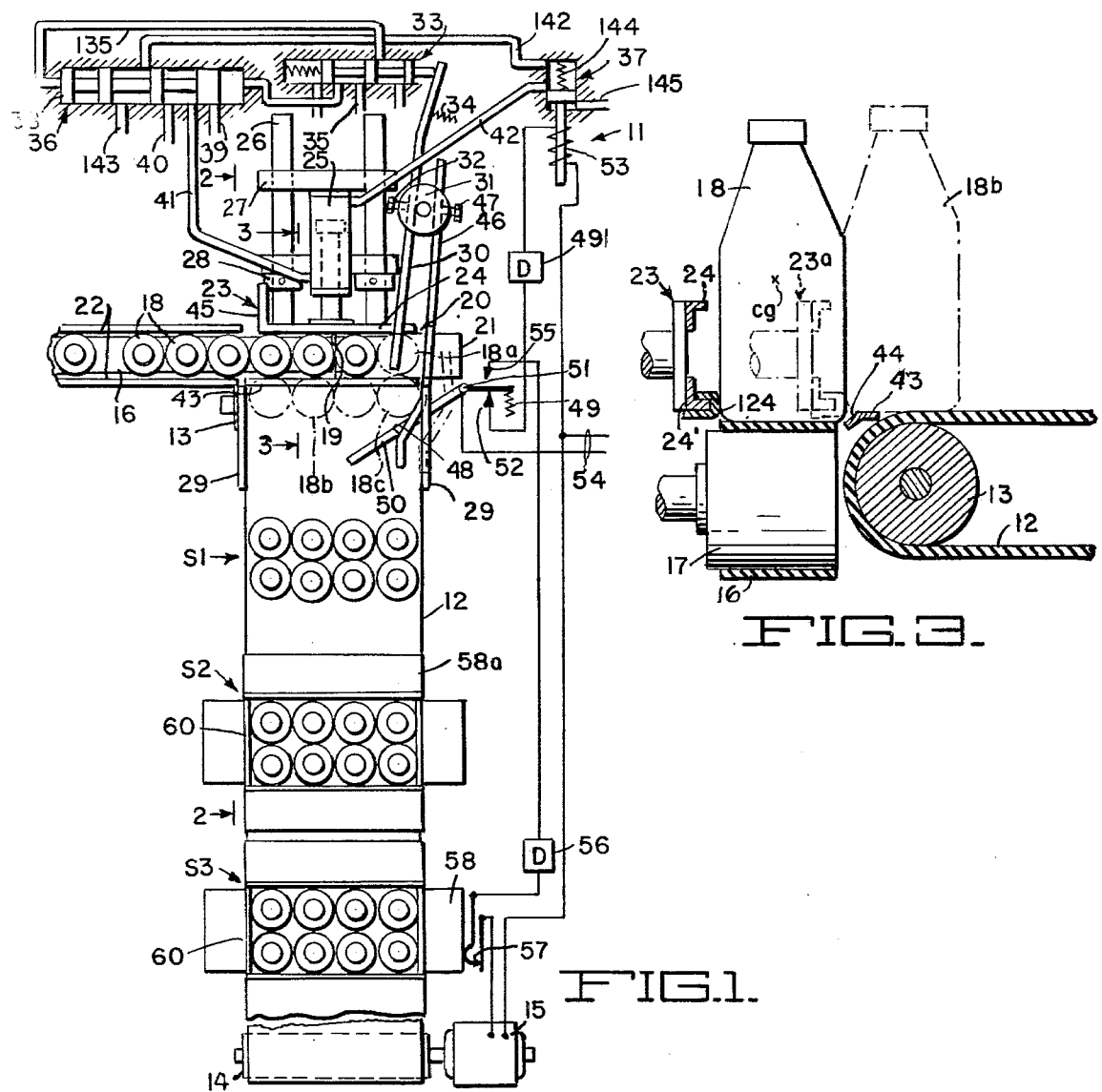
FIG.1.
FIG.3.
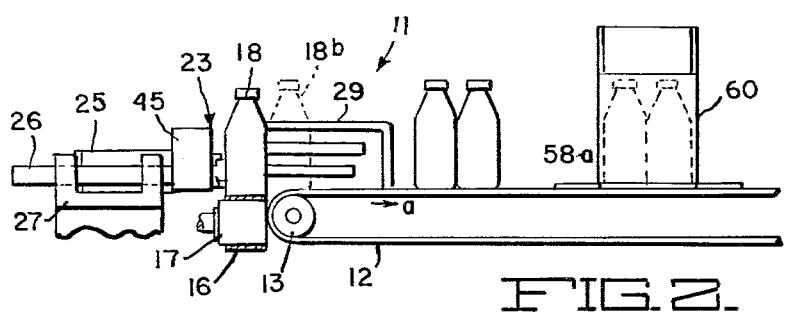
FIG.2.

CASER UNIT FOR CONTAINERS

BACKGROUND OF THE INVENTION

Field of the Invention

This invention relates to apparatus for packaging filled containers, such as bottles, cans, etc., and has particular reference to apparatus for casing caseloads of such containers.

In my prior U.S. Pat. No. 2,734,323, issued on Feb. 14, 1956, I disclose an apparatus in which the containers, after being filled, are carried by a continuously moving conveyor onto a dead plate where they accumulate against a stop to form a caseload. At such time, the operator places an empty case having its under flaps open, over such caseload. In doing so, he actuates a barrier which blocks oncoming containers and also removes the stop so that he can slide or otherwise move the filled case onto a second conveyor where the filled case is carried to a flap folding and glueing device.

Although such prior caser unit works satisfactorily, it entails considerable mechanism which requires frequent servicing. Also, it is difficult to adjust to accommodate containers of different sizes and number of containers per case. Further, and of paramount importance, the prior unit requires the operator to manually slide or otherwise move the relatively heavy filled cases from one section of the apparatus to another. This is not only tiring but time consuming so that if the operator falls behind, the entire apparatus may have to be shut down until he catches up.

SUMMARY OF THE INVENTION

Accordingly, a principal object of the present invention is to provide a caser unit of the above general type which is of simple construction and economical to manufacture.

Another object is to increase the speed and ease with which an operator can case loaded containers.

Another object is to provide a caser unit which is readily and easily adjustable to accommodate containers of different sizes and numbers per caseload.

Another object is to provide a caser unit which obviates the need for the operator to manually move a filled, and therefore relatively heavy, case from one section of the apparatus to another.

According to the present invention, a normally stationary main conveyor is provided, onto which filled containers are accumulated in a predetermined number of rows forming a caseload. A second continuously moving conveyor is provided for yieldably moving the containers in a single column to a loading station located at one end of the main conveyor. A control device determines when a complete caseload row of containers arrives at the loading station and then causes operation of a platen to sweep such row of containers laterally onto the main conveyor. As a second row of containers arrives at the loading station the control device again causes the platen to sweep the second row onto the main conveyor and to cause the second row to advance the first row. A second control device determines when the requisite number of rows, i.e. two rows, have been moved onto the main conveyor to make up a caseload and then causes actuation of a drive means for such main conveyor to carry the caseload to a casing station separated from the loading station and other containers. The conveyor stops at such casing station. Thus, the operator need merely place an empty case with open under flaps over the completed caseload, whereafter the conveyor will carry the filled case through one or more additional casing stations and then to a suitable flap folding and glueing apparatus.

Since the operator's duties are reduced to a minimum and since he can easily apply an empty case over the caseload when stationary at any of the casing stations he should be able to always keep up with the apparatus. However, means are provided to automatically shut down the apparatus if the operator fails to fit a case over a caseload in time.

BRIEF DESCRIPTION OF THE DRAWINGS

The manner in which the above and other objects of the invention are accomplished will be readily understood on reference to the following specification when read in conjunction with the accompanying drawing, wherein:

FIG. 1 is a plan view of a caser unit embodying a preferred form of the present invention.

FIG. 2 is a side elevation view of the caser unit and is taken along the line 2—2 of FIG. 1.

FIG. 3 is an enlarged sectional elevation view taken along the line 3—3 of FIG. 1.

DESCRIPTION OF THE PREFERRED EMBODIMENT

While this invention may be embodied in many different forms, there is shown in the drawing and will be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring to the drawing, the caser unit is generally indicated at 11 and is preferably, although not necessarily, intended to be associated with other units of a container filling and packaging apparatus, such as disclosed in my aforementioned patent.

The unit 11 comprises a relatively wide endless belt conveyor 12 which is carried over rollers 13 and 14. The conveyor is normally stationary but is arranged to be driven in the direction of arrow a (FIG. 2) by an electric motor 15. A second endless belt conveyor 16 is located adjacent the loading end of the conveyor 12 and is continuously driven over rollers, one of which is shown at 17, in a direction of right angles to the direction of movement of the conveyor 12 to yieldably move filled containers 18 in a single column from a suitable filling unit (not shown) to a loading station generally indicated at 20.

It will be noted that the loading station 20 extends along the width of the conveyor 12 and that the conveyor 16 extends only partly along the length of the loading station, terminating at 19. However, a stationary dead plate 12 extends over the remainder of the loading station at a horizontal level substantially even with the upper run of the conveyor 16 to receive containers 18 passing off the conveyor 16.

Spaced guide walls 22 are provided to guide the containers 18 along the length of the conveyor 16 in a single column. Such guide walls may be adjusted in a suitable manner, not shown, to accommodate containers of different sizes and shapes.

A container loading platen generally indicated at 23 is provided comprising vertically spaced angle members or ledges 24 and 24' (FIG. 3) which extend the width of the conveyor 12. A plastic ridge 124 is mounted on the lower member 24' and projects forwardly of a vertical plane passing through the forward edge of the upper member 24. The ridge 124 aids in guiding the containers 18 into the loading station.

The platen 23 is movable toward and away from the main conveyor 12 by the piston of an air operated cylinder 25 and is guided by a pair of spaced guide rods 26 secured thereto and slideably supported in bearings formed in a stationary guide member 27. Stop collars 28 may be adjustably secured on the guide rods 26 to limit against the member 27 and thus normally align the platen members 25 and 24' with the rearmost guide wall 22.

Control means are provided to determine when a full caseload row of containers 18, in this case four containers, is located in the loading station 20 and comprises a sensing lever or member 30 which is adjustably secured to a pivotal member 31 by a set screw 32. The member 31 is suitably supported for movement about a vertical axis passing through its center. Member 30 engages the spring pressed actuating valve spool of an air control pilot valve 33 for controlling the flow of air from a pressurized source 35 to either end of the valve spool 38 of a transfer valve 36 to move the latter spool to either a right hand or a left hand position.

The lever 30 is normally urged clockwise by a tension spring 34 into its position illustrated in FIG. 1 to allow the valve 33 to assume its illustrated position causing air from source 35 to force valve spool 38 of valve 36 into its illustrated left hand position thereby enabling pressurized air from a pressure supply source 40 to be applied over a conduit 41 to the forward end of the piston of air cylinder 25, thus holding the platen 23 in its rearmost position shown in FIGS. 1 and 2. At such time, the rear end of the piston is vented to the atmosphere through a conduit 42, a normally energized solenoid operated valve 37, a second conduit 142, valve 36 and exhaust conduit 143. However, when a full row of four containers 18 is accumulated in the loading station 20, the lever 30 is rocked counterclockwise by the foremost container 18a, thus moving the valve spool of valve 33 to its left hand position to apply air pressure from source 35 and through a conduit 135 to the left hand end of the transfer valve 36, thus shifting the valve spool 38 to the right to transfer air from the pressure source 40 through conduit 142, valve 37 and conduit 42 to the rear end of the piston of air cylinder 25. Therefore, the platen 23 is moved forwardly from its full line position shown in FIG. 3 to its dot-dash line position 23a. Concurrently, the valve spool 38 will vent the forward end of the cylinder 25 through conduit 41 and a vent conduit 39. Accordingly, the platen 23 will move the row of containers 18 in the loading station 20 laterally onto the conveyor 12 to their dot-dash line positions 18b.

As seen in FIG. 3, the upper run of the conveyor 16 is located slightly below the level of the upper run of the conveyor 21 and a stationary elongate guide member 43 having an inclined upper guide surface 44 extends across with width of the conveyor 12 to normally aid the ridge 124 on platen member 24' in laterally guiding the containers 18 in a single column into the loading station 20 after passing beyond the guide walls 22. However, when the platen 23 is moved forwardly, the containers 18 in the loading station 20 are swept over the inclined surface 44 of member 43 and onto the conveyor 12. Since the ridge 124 projects forwardly of the upper member 24, the containers tend to tilt rearwardly slightly as they move over the inclined surface 44 until they engage the member 24 to facilitate their sliding movement over the member 43. Also, to prevent forward tipping of the containers 18 during this movement, the platen members 24 and 24' are both preferably located with their container engaging surfaces below the centers of gravity cg of the containers, although the same result could be obtained by locating the engaging surface of member 24 in horizontal alignment with such centers of gravity. The lower member 24' is located adjacent the horizontal planes of the upper runs of the conveyors 12 and 16 so as to apply a horizontally directed container shifting force substantially coincident with such planes and thus bodily shift the containers up the inclined surface 44 without tendency of tipping. The upper member 24 tends to steady the containers 18 during such movement.

When the platen 23 is advanced to sweep a row of containers 18 laterally onto the conveyor 12, a blocking wall 45 on the left hand end of the platen moves across a path of travel of the containers 18 carried by the conveyor 16 and thus blocks the oncoming containers from entering the loading station 20 until the platen is again returned to its initial position. Also, side guide rails 29 extending along the edges of the conveyor 12 preventing the containers 18 from being accidentally displaced laterally from the conveyor.

As the row of containers 18 move into their positions 18b they pass the forward end of sensing member 30, allowing it to return clockwise, thus permitting the pilot valve 33 to effect return of the valve spool 38 to its left hand position to return the plate 23 to its initial illustrated position.

A second sensing lever 46 is adjustably secured to the pivotal member 31 by a set screw 47. Lever 46 is bent at 48 near its forward end to be engaged by the right hand containers 18c of the foremost row of containers 18a when the requisite number of rows of containers (in this case two) has been moved onto the conveyor 12 by the platen 23 to form a caseload. Sensing lever 46 thus prevents return of the platen 23 to its initial position shown in FIG. 1 after a caseload has been accumulated on conveyor 12, and until the conveyor 12 has advanced the newly formed case load a substantial distance away from the loading station 20, as will be described presently.

An additional control device is provided comprising a motor control switch 50 which is pivotally supported at 51 and is urged clockwise by a spring 49 into its illustrated position where it is located in the path of the container 18c in the foremost row of containers in the newly formed caseload. Normally, before being actuated, the switch 50 completes a circuit through switch contact 52, delay circuit 491, and solenoid 53 of valve 37 across a power supply circuit 54 to hold the valve 37 in its illustrated condition. However, when the switch 50 is actuated by the advancing container 18c, the circuit through valve solenoid 53 is opened allowing a tension spring 144 to retract the valve spool of valve 37 upwardly to block communication between valve 36 and the rear end of the piston of cylinder 25 and to vent the rear end of the piston to the atmosphere through exhaust conduit 145. At the same time, switch contact 55 is closed, completing a circuit across power supply circuit 54, through a time delay circuit 56, normally open flap sensing switch 57 and the motor 15 to energize the motor. The switch 57 is closed by a flap 58 of an open case 60 placed over a case load of containers as it arrives at a third casing station S3. Such case 60 may be open at its bottom side only with certain of its flaps, i.e. 58a, resting on the conveyor 12 or it may be open at both its bottom and its top side as illustrated in FIG. 2.

The delay circuit 56 maintains the motor 15 energized during movement of the cases 60 past the switch 57, from one flap 58 to the next, but allows the motor circuit to open in the absence of a case 60 over a caseload as the latter remain in the casing station S3.

In operation, containers 18 are advanced in a single column from the filling apparatus by the conveyor 16. Initially, the conveyor 12 is at rest and the switch 50 is in its illustrated position completing a circuit through the valve solenoid 53 to cause valve 37 to connect valve 36 to the rear end of the piston of cylinder 25. Member 30 is in its position shown in FIG. 1, permitting valve 33 to maintain the valve spool 38 of valve 36 in its left hand position to maintain the platen 23 in its rearmost position shown in FIG. 1. When the right hand container 18a engages the sensing member 30, as an incident to a complete row of containers filling the loading station 20, the member 30 actuates valve 33 to transfer air pressure to the left hand end of valve 36, causing the valve spool 38 to shift to its right hand position, thereby permitting air from pressure source 40 to be applied over conduit 142 to advance the platen 23 to sweep the row of the containers 18 in the loading station 20 onto the conveyor 12. As the right hand container 18a passes the end of the lever 30, the latter is returned clockwise causing the valve spool of valve 33 to return rightwardly to effect shifting of the spool valve 38 to the left to retract platen 23 rearwardly, allowing a second row of containers 18 to fill the loading station 20. As the lever 30 is again rocked counterclockwise, it again causes the platen 23 to be advanced to sweep the second row of containers onto the conveyor 12 and to slide the previous row ahead of it. At this time, the right hand container 18a of the foremost row of containers 18 engages the switch 50, completing a circuit through the motor 15, providing the switch 57 is closed by the flap 58 of an open case 60 at station 53, which case was placed over a caseload of containers at any of the casing stations S1, S2, and S3.

During the early part of such movement of the conveyor 12, the lever 46 will be held in a counterclockwise rocked position by the right hand containers, i.e. 18c, of both rows of the newly formed caseload to prevent retraction of the platen 23 to its initial position until the caseload has advanced a substantial distance from the loading station.

Accordingly, the motor will drive the conveyor 12 until the container 18 in the last row of the caseload passes the end of switch 50 at which time the switch 50 will return to open the motor circuit causing the conveyor to stop. At this time, switch 50 will complete a circuit through solenoid 53 to cause valve 37 to transfer air pressure to the left end of valve spool 38, shifting the same to its right hand position to cause the platen 23 to sweep the next row of containers in the loading station onto the conveyor 12.

The time delay circuit 49 is preferably placed in series with the solenoid 53 to maintain the valve 37 open for a short time after the switch contact 52 opened. Such time delay circuit is, however, not effective to delay energization of solenoid 53 when the contact 52 is first closed.

Thus, the operator can easily and quickly fit an open case, i.e. 60, over a caseload at any of the casing stations S1, S2 or S3 where a case has not yet been placed, permitting the conveyor 12 to carry the filled cases to suitable flap folding and glueing devices, not shown.

The caser unit may be readily adjusted to accommodate containers and cases of different sizes. For this purpose, the levers 30 and 46 may be adjusted and/or bent and the pivot 51 for switch 50 repositioned to control the number of containers in each caseload row and the number of rows in each caseload.

I claim:

1. In a caser cor casing upright containers, the combination comprising
   first conveyor means,
   second conveyor means for moving said containers in a column to a loading zone adjacent said first conveyor means,
   the container supporting plane of said second conveyor means being located below the container supporting plane of said first conveyor means,
   transferring means comprising a platen moveable from an initial position on one side of said second conveyor for transferring said containers from said second conveyor means to said first conveyor means,
   a stationary guide member mounted between said first and second conveyors on the other side of said second conveyor so that it is spaced from said platen when said platen is in said initial position and cooperative with said platen to guide said containers to said loading station,
   said guide member having an inclined upper surface, and
   means for moving said platen from said initial position across said second conveyor to move said containers over said inclined surface and onto said first conveyor means,
   said platen comprises an upper container engaging ledge projecting from said platen located in a horizontal plane extending through or below the centers of gravity of said containers while at said loading station and a lower container engaging ledge projecting from said platen and located below said upper ledge, said lower ledge projecting further from said platen than said upper ledge whereby said lower ledge initially solely advances said containers onto said guide member and said upper ledge engages those containers tilted by said guide member.

2. The combination as defined in claim 1 wherein said lower engaging ledge located adjacent said plane of said first conveyor means.

3. The combination as defined in claim 1 wherein said loading zone extends across the width of said first conveyor means at one end of said conveyor means.

4. The combination as defined in claim 1 wherein said first conveyor means comprises an endless conveyor and at least one roller for supporting a portion of said conveyor;
   said loading station extending between said portion of said conveyor and said platen when said platen is in said initial position, and
   said guide member extending between said second conveyor means and said portion of said conveyor.

5. The combination as defined in claim 1 wherein said upper surface of said guide member includes upwardly at least substantially from said plane of said second conveyor means to said plane of said first conveyor means.

6. The combination as defined in claim 1 wherein said lower ledge is located adjacent said plane of said first conveyor means.

* * * * *